UNITED STATES PATENT OFFICE.

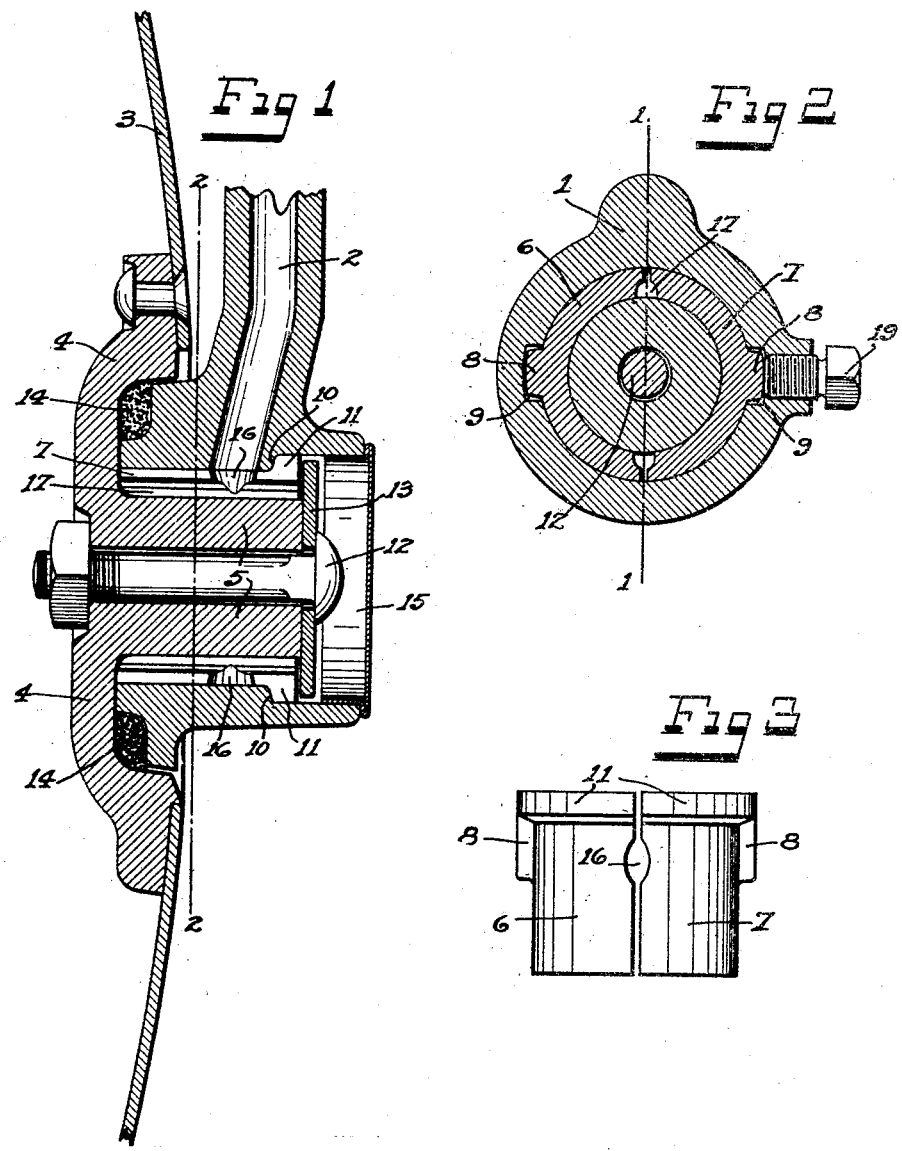

GEORGE W. PERKS, OF SPRINGFIELD, OHIO, ASSIGNOR TO THE AMERICAN SEEDING MACHINE COMPANY, OF SPRINGFIELD, OHIO, A CORPORATION OF OHIO.

BEARING FOR SINGLE-DISK FURROW-OPENERS.

1,186,033.  Specification of Letters Patent.  Patented June 6, 1916.

Application filed September 7, 1915. Serial No. 49,320.

*To all whom it may concern:*

Be it known that I, GEORGE W. PERKS, a citizen of the United States, residing at Springfield, in the county of Clark and State of Ohio, have invented certain new and useful Improvements in Bearings for Single-Disk Furrow-Openers, of which the following is a specification.

This invention relates to improvements in bearings for single disk furrow openers for seeding machines.

The object of the invention is to provide a bearing of the character referred to which will be simple in construction and in which provision may be easily and simply effected for taking up wear.

In the accompanying drawings: Figure 1 is a vertical sectional view of a portion of a disk furrow opener and its support showing my bearing improvements, the section being on the line 1—1 of those parts shown in Fig. 2. Fig. 2 is a section on the line 2—2 of Fig. 1. Fig. 3 is a plan view of the two part bushing.

In said drawings 1 represents the usual support which is attached to the rear end of the drag bar (not shown) this support being provided with the usual oil reservoir 2 leading to the bearing. The disk 3 is of the usual concavo convex form and has secured on the concave side thereof and about the central opening thereof the usual cup-shaped hub portion 4 having the centrally arranged trunnion 5 which projects through the opening. Located in the support 1 are the members 6 and 7 of a two-part bushing, each member having a projecting lug 8 on its outer periphery which projects into a recess 9 in the support to prevent the bushing members from turning. The cored out portion of the support which receives these bushings is enlarged at the outer end to form a shoulder 10 and each bushing member is provided with a peripheral flange 11 at its extreme outer end to engage the shoulder 10. The trunnion 5 is journaled in the two-part bushing and has a plate 13 clamped to the outer end of the same by the head of a bolt 12 extended through the trunnion; said plate embracing the ends of the bushing members so as to prevent lateral displacement of the parts. The inner side of the support 1 extends within the cup-shaped hub 4 and is shaped to form a recess to receive packing material 14 to exclude dust at that point, and the outer end of the bore of the support receives a cap 15 for the same purpose.

The bushing members are so disposed that the dividing line between the same is in a vertical plane and the meeting faces of the respective members of the bushing are provided with adjacent recesses 16, the upper pair of which will stand in line with the oil conduit 2 so as to permit the oil to find its way to the wearing surfaces between the bushing members and the trunnion; the meeting faces of said bushing being further provided with longitudinally extending channels 17 to facilitate the passage of the lubricant to the extreme ends of the bearing surfaces.

In the original assembly of the parts, the bushing members will be so proportioned that a space will be left between the meeting faces thereof in order to permit the same to be adjusted toward each other to take up wear, an adjusting screw 19 threaded into the support 1 and bearing against the lug 8 of one of the bushing members being employed for this purpose.

By this construction it will be seen that an extremely simple arrangement is secured which employs but few parts and which may be quickly and easily assembled and in which provision is made for readily adjusting the same to take up wear.

Having thus described my invention, I claim:—

1. In a bearing for disk furrow openers, a support, a disk having a central opening, a trunnion secured to said disk, a divided bushing arranged in said support in a manner to prevent rotation thereof, said trunnion being journaled in said bushing members, said support and bushing members having a shoulder and flange respectively, and a plate secured to the inner end of said trunnion and embracing the inner ends of said bushing member to prevent lateral displacement of the parts.

2. In a bearing for disk furrow openers, a support, a disk having a central opening, a cup-shaped hub portion secured to said disk about said opening on one side of said support, a trunnion projecting centrally from said hub portion, a divided bushing arranged in said support together with means for preventing rotation of same, said support and bushing members having a shoulder and flange respectively, and a clamping plate secured to the inner end of said trunnion and embracing the inner ends of said bushing members on the opposite side of said support to prevent lateral displacement of the parts.

3. In a bearing for disk furrow openers, a support, a disk, a trunnion secured to said disk, a divided bushing arranged in said support, said support and bushing having means for preventing rotation of said bushing, said trunnion being journaled in said bushing, and means for preventing lateral displacement of the parts, and an oil conduit in said support, the dividing faces of said bushing member coinciding with said oil conduit, said bushing faces having coinciding recesses arranged in line with said conduit.

4. In a bearing for disk furrow openers, a support, a disk, a trunnion secured to said disk, a divided bushing arranged in said support, said support and bushing having means for preventing rotation of said bushing, said trunnion being journaled in said bushing, means for preventing lateral displacement of the parts, an oil conduit in said support, the divided faces of said bushing members coinciding with said oil conduit, said bushing faces having coinciding recesses arranged in line with said conduit and the inner bore of said bushing members having longitudinally arranged passages leading from said recesses.

In testimony whereof, I have hereunto se my hand this 30th day of August 1915.

GEORGE W. PERKS.

Witnesses:
HENRY O. KLINCK,
PERCY F. SILVER.